US005746437A

United States Patent [19]

Faber

[11] Patent Number: 5,746,437

[45] Date of Patent: May 5, 1998

[54] RATCHETING HUB WHEELCHAIR ATTACHMENT

[76] Inventor: Robin L. Faber, 4201 Columbia Dr., Cheyenne, Wyo. 82009

[21] Appl. No.: 582,505

[22] Filed: Jan. 3, 1996

[51] Int. Cl.[6] ........ B62M 1/14

[52] U.S. Cl. ........ 280/304.1; 280/250.1

[58] Field of Search ........ 280/304.1, 250.1, 280/236, 238, 242.1, 246, 252, 253, 255; 297/DIG. 4; 188/2 F; 192/41 R, 43, 43.1, 64

[56] References Cited

U.S. PATENT DOCUMENTS

| | | | |
|---|---|---|---|
| 4,045,047 | 8/1977 | Buckley | 280/250.1 |
| 4,453,729 | 6/1984 | Lucken | 280/250.1 |
| 4,520,804 | 6/1985 | DiGeorge | 602/16 |
| 4,727,965 | 3/1988 | Zach et al. | 280/250.1 X |
| 4,766,772 | 8/1988 | Tsuchie | 280/255 X |
| 5,197,750 | 3/1993 | Digeorge | 280/250.1 |
| 5,228,709 | 7/1993 | Kao | 280/250.1 |
| 5,236,398 | 8/1993 | Barnett | 280/250.1 X |
| 5,301,971 | 4/1994 | Brereton et al. | 280/242.1 X |

*Primary Examiner*—Kevin Hurley

[57] ABSTRACT

A ratcheting hub wheelchair attachment for permitting rotation of a wheel of a wheelchair in a selected direction. The inventive device includes a hub mounting assembly for securing to a hub of a wheel of a wheelchair. A ratchet assembly is rotatably mounted relative to the hub mounting assembly and can be secured to a wheel axle of the wheelchair for selectively permitting rotation of the hub mounting assembly and attached wheel of the wheelchair in one of the two directions of rotation of the wheel relative to the wheelchair to permit for ease of traversing of the wheelchair along an inclined slope.

10 Claims, 3 Drawing Sheets

RATCHETING HUB WHEELCHAIR ATTACHMENT

BACKGROUND OF THE INVENTION

1. Field of the Invention

The present invention relates to wheelchair structures and more particularly pertains to a ratcheting hub wheelchair attachment for permitting rotation of a wheel of a wheelchair in a selected direction.

2. Description of the Prior Art

The use of wheelchair structures is known in the prior art. More specifically, wheelchair structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art wheelchair structures include U.S. Pat. No. 5,362,081; U.S. Pat. 5,301,971; U.S. Pat. No. 5,158,309; U.S. Pat. No. 5,197,750; and U.S. Design Pat. No. 330,177.

While these devices fulfill their respective, particular objectives and requirements, the aforementioned patents do not disclose a ratcheting hub wheelchair attachment for permitting rotation of a wheel of a wheelchair in a selected direction which includes a hub mounting assembly for securing to a hub of a wheel of a wheelchair, and a ratchet assembly rotatably mounted relative to the hub mounting assembly which can be secured to a wheel axle of the wheelchair for selectively permitting rotation of the hub mounting assembly and attached wheel of the wheelchair in one of the two directions of rotation of the wheel relative to the wheelchair to permit for ease of traversing of the wheelchair along an inclined slope.

In these respects, the ratcheting hub wheelchair attachment according to the present invention substantially departs from the conventional concepts and designs of the prior art, and in so doing provides an apparatus primarily developed for the purpose of permitting rotation of a wheel of a wheelchair in a selected direction.

SUMMARY OF THE INVENTION

In view of the foregoing disadvantages inherent in the known types of wheelchair structures now present in the prior art, the present invention provides a new ratcheting hub wheelchair attachment construction wherein the same can be utilized for permitting rotation of a wheel of a wheelchair in a selected direction. As such, the general purpose of the present invention, which will be described subsequently in greater detail, is to provide a new ratcheting hub wheelchair attachment apparatus and method which has many of the advantages of the wheelchair structures mentioned heretofore and many novel features that result in a ratcheting hub wheelchair attachment which is not anticipated, rendered obvious, suggested, or even implied by any of the prior art wheelchair structures, either alone or in any combination thereof.

To attain this, the present invention generally comprises a ratcheting hub wheelchair attachment for permitting rotation of a wheel of a wheelchair in a selected direction. The inventive device includes a hub mounting assembly for securing to a hub of a wheel of a wheelchair. A ratchet assembly is rotatably mounted relative to the hub mounting assembly and can be secured to a wheel axle of the wheelchair for selectively permitting rotation of the hub mounting assembly and attached wheel of the wheelchair in one of the two directions of rotation of the wheel relative to the wheelchair to permit for ease of traversing of the wheelchair along an inclined slope.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new ratcheting hub wheelchair attachment apparatus and method which has many of the advantages of the wheelchair structures mentioned heretofore and many novel features that result in a ratcheting hub wheelchair attachment which is not anticipated, rendered obvious, suggested, or even implied by any of the prior art wheelchair structures, either alone or in any combination thereof.

It is another object of the present invention to provide a new ratcheting hub wheelchair attachment which may be easily and efficiently manufactured and marketed.

It is a further object of the present invention to provide a new ratcheting hub wheelchair attachment which is of a durable and reliable construction.

An even further object of the present invention is to provide a new ratcheting hub wheelchair attachment which is susceptible of a low cost of manufacture with regard to both materials and labor, and which accordingly is then susceptible of low prices of sale to the consuming public, thereby making such ratcheting hub wheelchair attachments economically available to the buying public.

Still yet another object of the present invention is to provide a new ratcheting hub wheelchair attachment which provides in the apparatuses and methods of the prior art some of the advantages thereof, while simultaneously overcoming some of the disadvantages normally associated therewith.

Still another object of the present invention is to provide a new ratcheting hub wheelchair attachment for permitting rotation of a wheel of a wheelchair in a selected direction.

Yet another object of the present invention is to provide a new ratcheting hub wheelchair attachment which includes a hub mounting assembly for securing to a hub of a wheel of a wheelchair, and a ratchet assembly rotatably mounted relative to the hub mounting assembly which can be secured to a wheel axle of the wheelchair for selectively permitting rotation of the hub mounting assembly and attached wheel of the wheelchair in one of the two directions of rotation of the wheel relative to the wheelchair to permit for ease of traversing of the wheelchair along an inclined slope.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
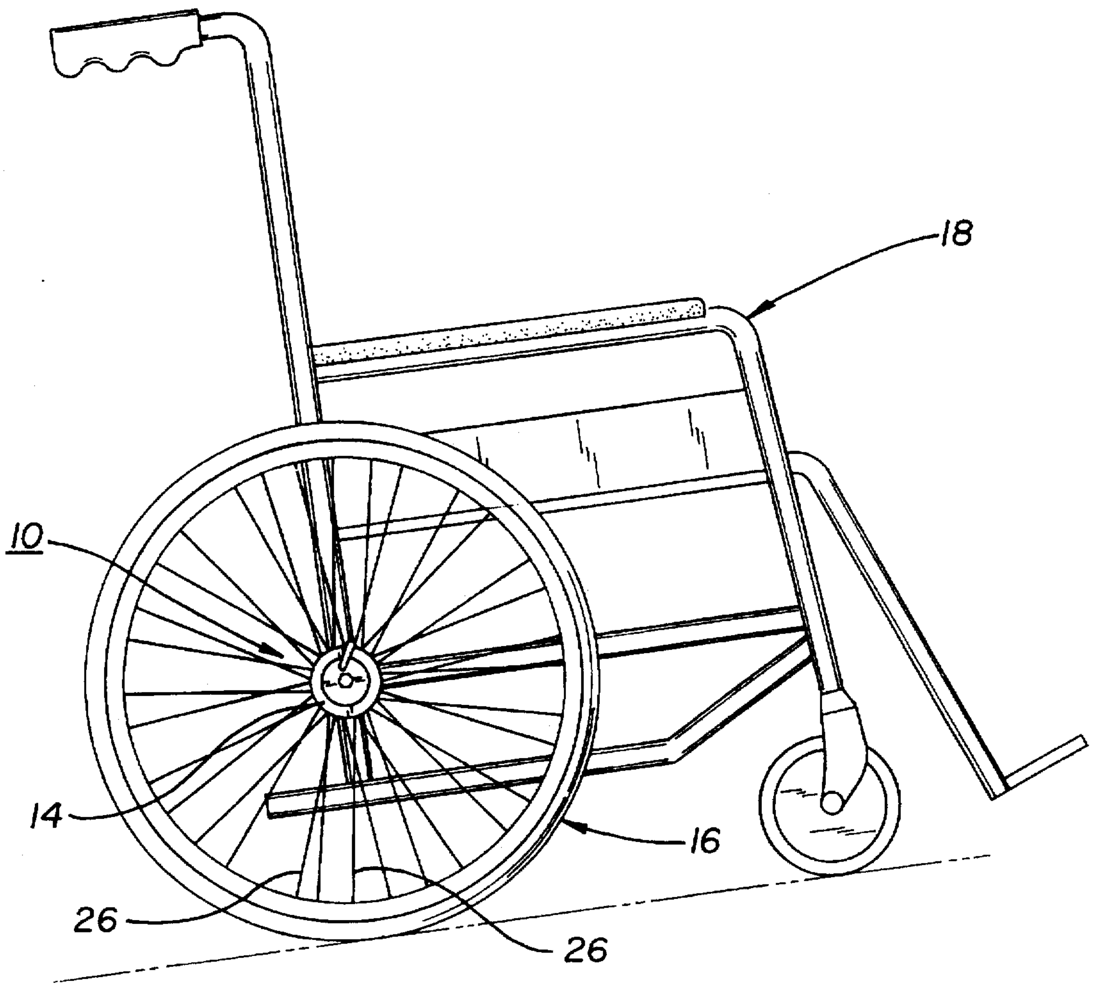
FIG. 1 is a side elevational view of a ratcheting hub wheelchair attachment constructed in accordance with the principles of the present invention.

With reference now to the drawings, and in particular to FIGS. 1–5 thereof, a new ratcheting hub wheelchair attachment embodying the principles and concepts of the present invention and generally designated by the reference numeral 10 will be described.

Figure 2:
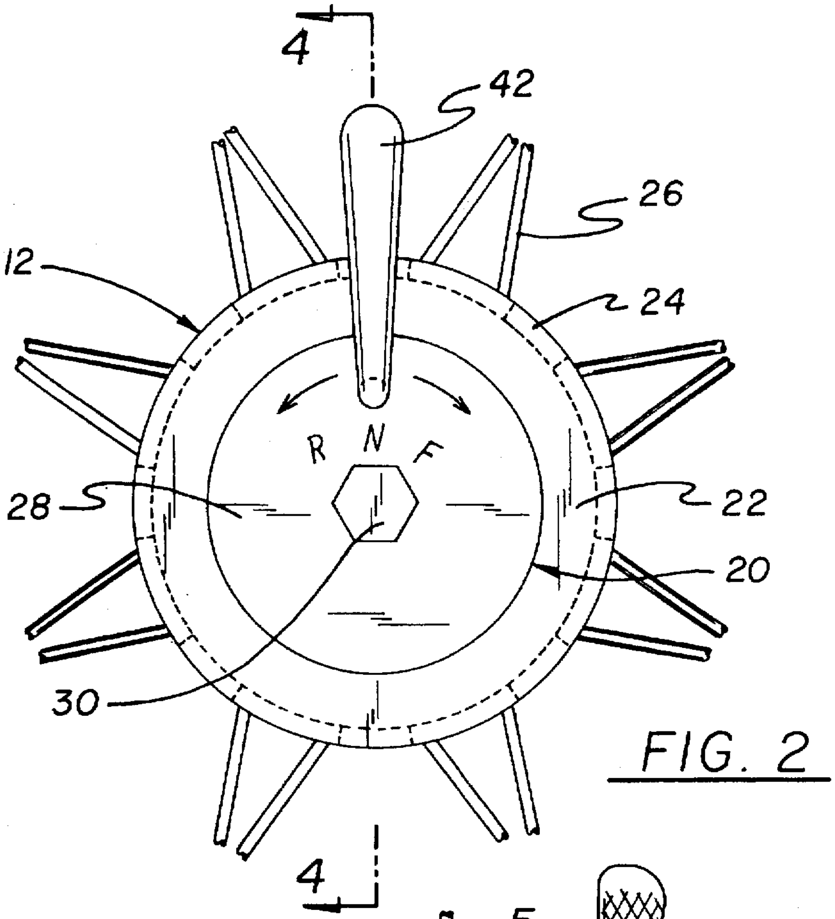
FIG. 2 is an enlarged side elevational view of the present invention.
Figure 3:
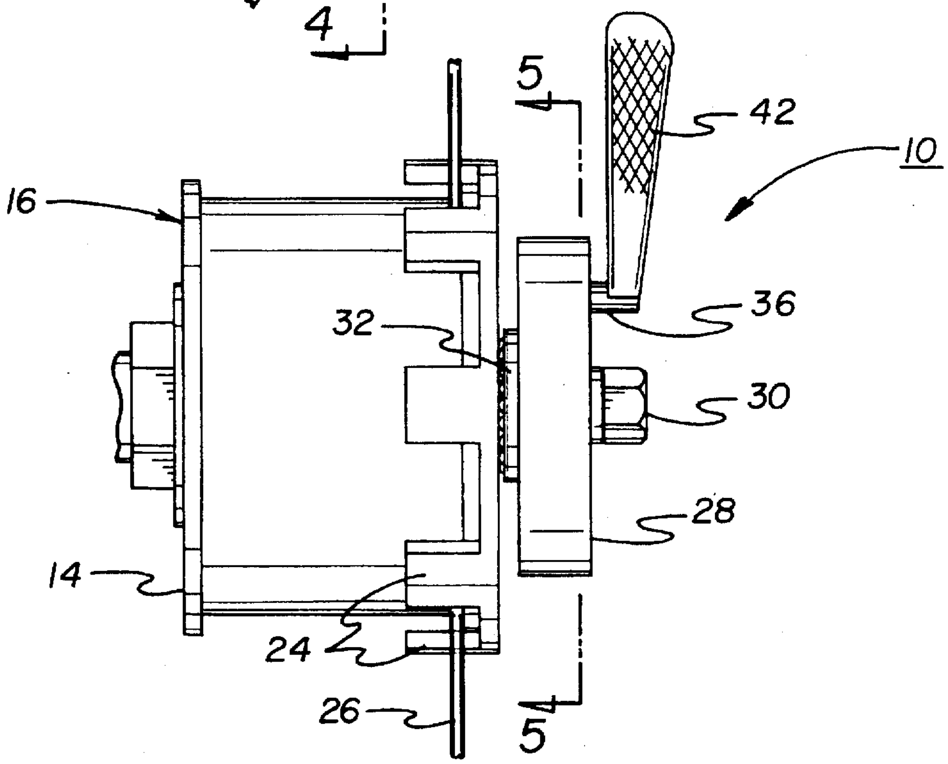
FIG. 3 is a rear elevational view of the invention.

More specifically, it will be noted that the ratcheting hub wheelchair attachment 10 comprises a hub mounting assembly 12 for attaching to a hub 14 of a wheel 16 of a wheelchair 18 or other conveyance substantially as shown in FIGS. 1 and 2 of the drawings. A ratchet assembly 20 is mounted relative to the hub mounting assembly 12 and can be secured to a wheel axle 23 (see FIG. 4) of the wheelchair 18 for permitting rotation of the wheel 16 of the wheelchair in a selected direction only. By this structure, an individual can select a desired direction of rotation of the wheel 16 of the wheelchair 18, whereby the ratchet assembly 20 will allow the hub 14 of the wheel of the wheelchair to rotate in one direction only to facilitate incremental propulsion of the wheelchair up an incline, as shown in FIG. 1 for example.

Referring to FIGS. 2 through 5 wherein the present invention 10 is illustrated in detail, it can be shown that the hub mounting assembly 12 of the present invention 10 preferably comprises a hub mounting plate 22 which can be abuttingly positioned against an outer surface of the hub 14 of the wheel 16 of the wheelchair 18. A plurality of spoke engaging members 24 project from an interior surface of the hub mounting plate 22 and can be positioned between adjacent spokes 26 of the wheel 16. By this structure, the hub mounting plate 22 will be caused to rotate with the wheel 16 during operation of the wheelchair 18.

Figure 4:
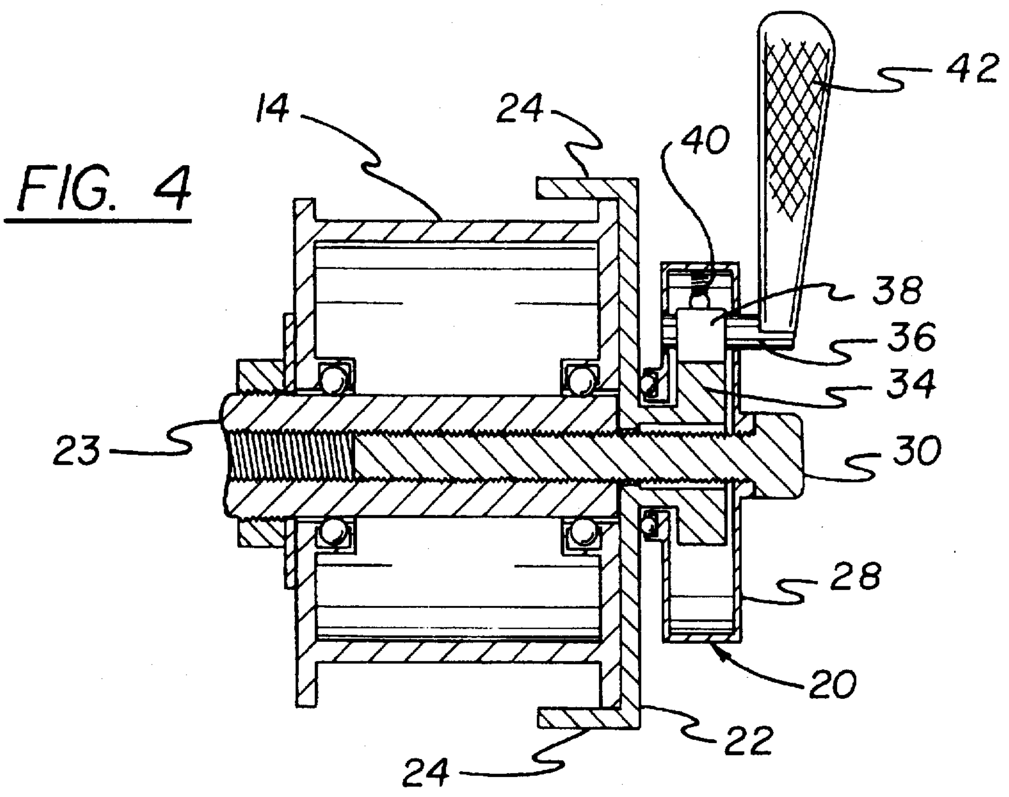
FIG. 4 is a cross sectional view of the invention taken along line 4—4 of FIG. 2.
Figure 5:
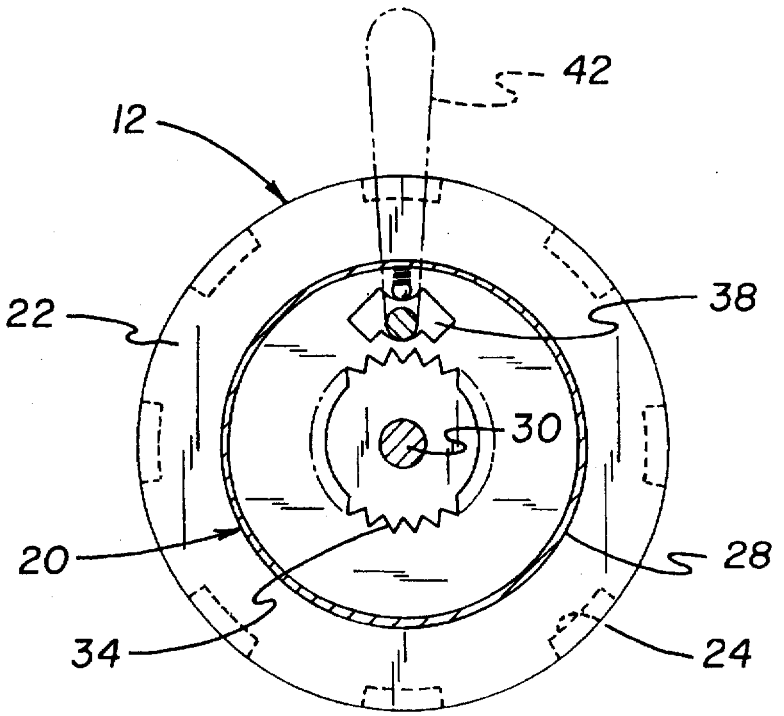
FIG. 5 is a cross sectional view of the invention taken along line 5—5 of FIG. 3.

As best shown in FIGS. 4 and 5, the ratchet assembly 20 comprises an outer housing 28 which can be secured to the wheel axle 23 of the wheelchair 18 by a securing bolt 30 directed through the outer housing and threadably or otherwise securely engaged with the wheel axle so as to fix the outer housing against rotation relative to the wheelchair 18. The outer housing 28 is rotatably supported relative to the hub mounting plate 22 of the hub mounting assembly 12 by a housing bearing assembly 32 interposed therebetween such that the hub mounting assembly 12 is permitted to rotate with the wheel 16 relative to the outer housing 28 which remains fixed against rotation relative to the wheelchair 18. A ratchet 34 is fixedly secured to the hub mounting plate 22 of the hub mounting assembly 12 so as to rotate therewith. The ratchet 34 is positioned within the outer housing 18 and extends concentrically about the securing bolt 30. A pawl axle 36 is directed through an eccentric portion of the outer housing 18 in a spaced and parallel orientation relative to the securing bolt 30. A pawl 38 is secured to the pawl axle 36 and is biased into engagement with the ratchet 34 by a spring 40 interposed between the pawl and an interior portion of the outer housing 28. As shown in FIG. 5, the pawl 38 is shaped so as to define at least two detent notches (unlabeled) within which the spring 40 can be positioned to bias the pawl into engagement with either a forward portion or a reverse portion of the ratchet 34 so as to allow for rotation of the hub mounting assembly 12, and the attached wheel 16, in only one direction. To facilitate selection of the desired direction of rotation through a positioning of the pawl 38 relative to the ratchet 34, the ratchet assembly 20 further comprises a pawl control lever 42 secured to the pawl axle 36 which can be manually manipulated to position the pawl within the outer housing 28 into a desired orientation relative to the ratchet 34. By this structure, an individual can selectively position the pawl control lever 42 to cause the pawl 38 to engage the ratchet 24 to allow rotation of the wheel 16 in only one direction, or alternatively to position the pawl 38 in disengagement relative to the ratchet 24, whereby the wheel 16 can then rotate in any desired direction.

In use, the ratcheting hub wheelchair attachment 10 of the present invention 10 can be easily utilized for permitting rotation of a wheel of a wheelchair in a selected direction. To this end, the invention 10 selectively permits the wheel 16 of the wheelchair 18 to rotate in a single direction, thereby facilitating ease of incremental propulsion of the wheelchair 18 up an inclined ramp or other slope.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A ratcheting hub attachment comprising:

a hub mounting assembly for attaching a hub of a wheel of a conveyance;

a ratchet assembly mounted relative to the hub mounting assembly which can be secured to a wheel axle of the conveyance for permitting rotation of the wheel of the conveyance in a single direction only wherein the hub mounting assembly comprises a hub mounting plate which can be abuttingly positioned against an outer surface of the hub of the wheel of the conveyance; and a plurality of spoke engaging members projecting from an interior surface of the hub mounting plate which can be positioned between adjacent spokes of the wheel; and wherein the ratchet assembly comprises an outer housing which can be secured to the wheel axle of the wheelchair, a ratchet fixedly secured to the hub mounting plate of the hub mounting assembly as to rotate wherewith, the ratchet being positioned within the outer housing; a pawl axle directed through an eccentric portion of the outer housing; and a pawl secured to the pawl axle and biased into engagement with the ratchet.

2. The ratcheting hub attachment of claim 1, wherein the pawl is biased into engagement with the ratchet by a spring interposed between the pawl and an interior portion of the outer housing.

3. The ratcheting hub attachment of claim 2, wherein the pawl is shaped so as to define at least two detent notches within which the spring can be positioned to bias the pawl into a plurality of predetermined orientations relative to the ratchet.

4. The ratcheting hub attachment of claim 3, wherein the ratchet assembly further comprises a pawl control lever secured to the pawl axle which can be manually manipulated to position the pawl within the outer housing into a predetermined orientation relative to the ratchet to facilitate selection of an allowed direction of rotation of the hub mounting assembly relative to the ratchet assembly.

5. The ratcheting hub attachment of claim 4, wherein the outer housing is rotatably supported relative to the hub mounting plate of the hub mounting assembly by a housing bearing assembly interposed therebetween such that the hub mounting assembly is permitted to rotate relative to the outer housing.

6. A ratcheting hub wheelchair attachment comprising:

a wheelchair including a wheel having a hub and spokes, the wheel being rotatably mounted relative to the wheelchair by a wheel axle;

a hub mounting assembly for attaching to the hub of the wheel of the wheelchair;

a ratchet assembly mounted relative to the hub mounting assembly, the ratchet assembly being secured to the wheel axle of the wheelchair for permitting rotation of the wheel of the wheelchair in a single direction only;

wherein the hub mounting assembly comprises a hub mounting plate abuttingly positioned against an outer surface of the hub of the wheel of the wheelchair; and a plurality of spoke engaging members projecting from an interior surface of the hub mounting plate which are positioned between adjacent pokes of the wheel; and wherein the ratchet assembly comprises an outer housing secured to the wheel axle of the wheelchair, a ratchet fixedly secured to the hub mounting plate of the hub mounting assembly so as to rotate therewith, the ratchet being positioned within the outer housing; a pawl axle directed through an eccentric portion of the outer housing; and a pawl secured to the pawl axle and biased into engagement with the ratchet.

7. The ratcheting hub wheelchair attachment of claim 6, wherein the pawl is biased into engagement with the rachet by a spring interposed between the pawl and an interior portion of the outer housing.

8. The ratcheting hub wheelchair attachment of claim 7, wherein the pawl is shaped so as to define at least two detent notches within which the spring can be positioned to bias the pawl into a plurality of predetermined orientations relative to the ratchet.

9. The ratcheting hub wheelchair attachment of claim 8, wherein the ratchet assembly further comprises a pawl control lever secured to the pawl axle which can be manually manipulated to position the pawl within the outer housing into a predetermined orientation relative to the ratchet to facilitate selection of an allowed direction of rotation of the hub mounting assembly relative to the ratchet assembly.

10. The ratcheting hub wheelchair attachment of claim 9, wherein the outer housing is rotatably supported relative to the hub mounting plate of the hub mounting assembly by a housing bearing assembly interposed therebetween such that the hub mounting assembly is permitted to rotate relative to the outer housing.

* * * * *